United States Patent [19]
Sorimachi et al.

[11] 3,909,833
[45] Sept. 30, 1975

[54] EXPOSURE CONTROL SYSTEM IN SINGLE-LENS REFLEX CAMERA OF THE TTL METERING TYPE

[75] Inventors: Kanehiro Sorimachi, Yokohama; Masayoshi Yamamichi, Sagamihara; Tadashi Ito, Yokohama; Soichi Nakamoto, Machida, all of Japan

[73] Assignee: Canon Kabushiki Kaisha, Tokyo, Japan

[22] Filed: Aug. 20, 1973

[21] Appl. No.: 389,469

[30] Foreign Application Priority Data
Aug. 31, 1972  Japan.............................. 47-87274

[52] U.S. Cl. .................. 354/29; 354/44; 354/45; 354/50; 354/271
[51] Int. Cl.² .................. G03B 7/14; G03B 7/10
[58] Field of Search............ 95/10 CE, 10 CD, 64 D; 354/29, 30, 50

[56] References Cited
UNITED STATES PATENTS

| | | |
|---|---|---|
| 3,657,987 | 4/1972 | Babcock et al. .............. 95/10 CD X |
| 3,662,659 | 5/1972 | Metzger et al. ................. 95/10 CD |
| 3,696,719 | 10/1972 | Tanikoshi ......................... 95/10 CD |
| 3,810,206 | 5/1974 | Sakaguchi et al. ..................... 354/50 |

*Primary Examiner*—Samuel S. Matthews
*Assistant Examiner*—James LaBarre
*Attorney, Agent, or Firm*—William R. Woodward

[57] ABSTRACT

In a single-lens reflex camera provided with an electronic shutter and a TTL metering lens having a preset aperture, an exposure control system includes means for automatically determining the lens aperture in accordance with a preset shutter speed and the brightness of an object to be photographed. An auxiliary aperture disposed in front of a light receiving element and operatively associated with the lens aperture preset member, is provided so that the electronic shutter is controlled by the light passed through the auxiliary aperture at the preset speed if a valid choice was made, and at a speed as near that as consistent with good exposure in other cases.

5 Claims, 4 Drawing Figures

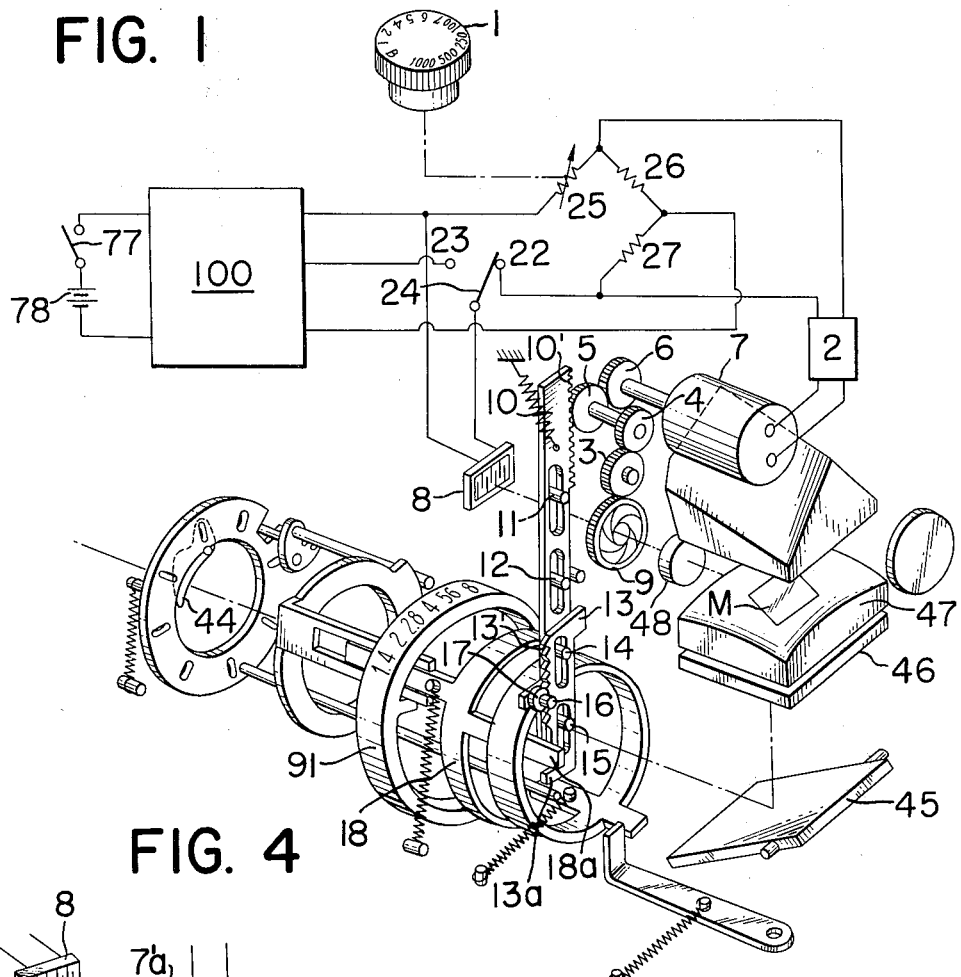
FIG. 1
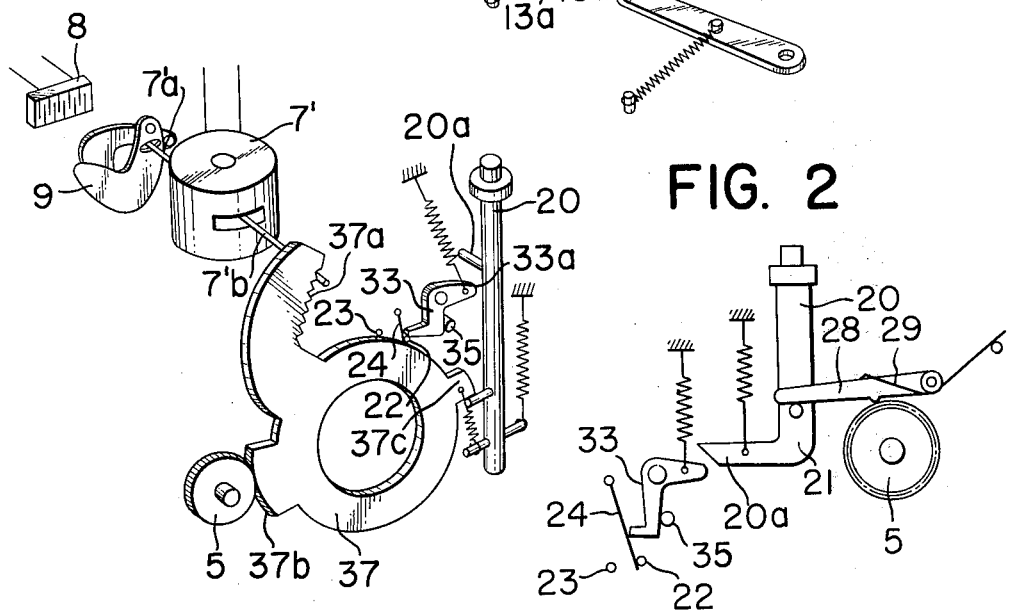
FIG. 4
FIG. 2

EXPOSURE CONTROL SYSTEM IN SINGLE-LENS REFLEX CAMERA OF THE TTL METERING TYPE

BACKGROUND OF THE INVENTION

1. Field of the Invention

This invention relates to improvements in the exposure control system of a single-lens reflex camera, and more particularly to a camera having an electronic shutter of the TTL metering type.

2. Description of the Prior Art

Exposure control systems whereby an exposure time is preset and then the aperture is automatically controlled in accordance with the present exposure time to thereby control the exposure time in accordance with the aperture value to provide a proper exposure are known, for example, from British Pat. No. 1,142,994 and Japanese Patent Publication No. 8669/1966, but neither of them relates to a single-lens reflex camera of the TTL fully-opened aperture photometering type. On the other hand, Japanese Patent Publications Nos. 17180/1966 and 18461/1966 and British Pat. No. 2,133,212 relate to a single-lens reflex camera which, however, is not of the TTL fully-opened aperture photometering type.

SUMMARY OF THE INVENTION

It is an object of the present invention to provide an exposure control system of the preset shutter speed type for use in a single-lens reflex camera of the TTL fully-opened aperture photometering type having an electronic shutter.

A feature of the present invention is that an auxiliary aperture is provided in front of a photoelectric element receiving light passed through a TTL fully-opened aperture photometering lens and that an exposure calculator including the photoelectric element and a resistor for setting the exposure time controls the auxiliary aperture and the lens aperture present member in accordance with the brightness of the object to be photographed, the sensitivity of the film in use and the preset exposure time, whereafter the photoelectric element is changed over for connection with the electronic shutter circuit.

The invention will become more fully apparent from the following detailed description of some specific embodiments thereof taken in conjunction with the accompanying drawings.

BRIEF DESCRIPTION OF THE DRAWINGS

FIG. 1 is a perspective view showing the construction of the essential portion of the system according to the present invention.

FIG. 2 is a front view of the shutter mechanism.

FIG. 4 is a perspective view showing a modified form of the drive mechanism for the auxiliary aperture and preset lever.

DESCRIPTION OF THE PREFERRED EMBODIMENTS

Figure 3:
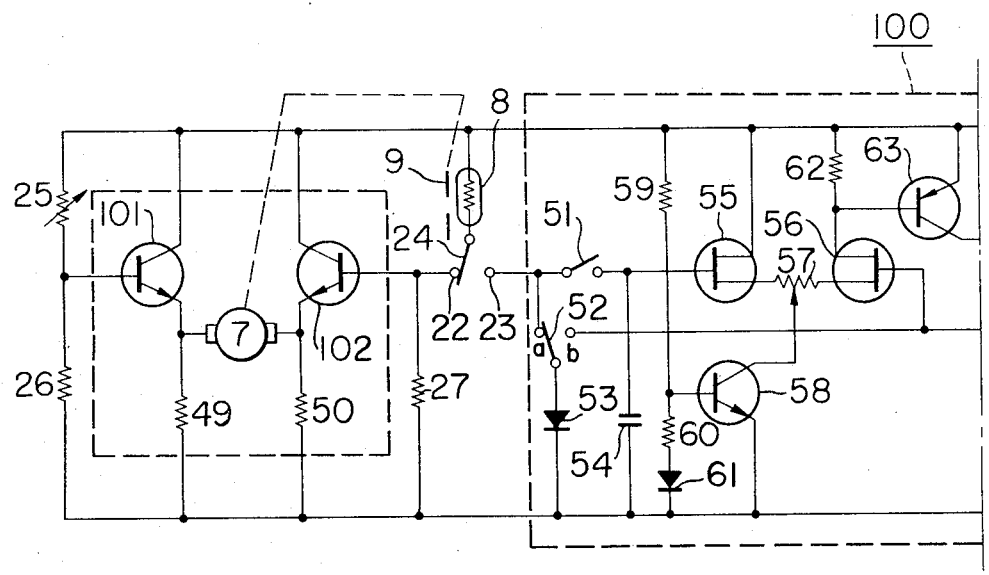
FIG. 3 is a circuit diagram showing an example of the electronic shutter applicable to the system of the present invention.
Figure 3:
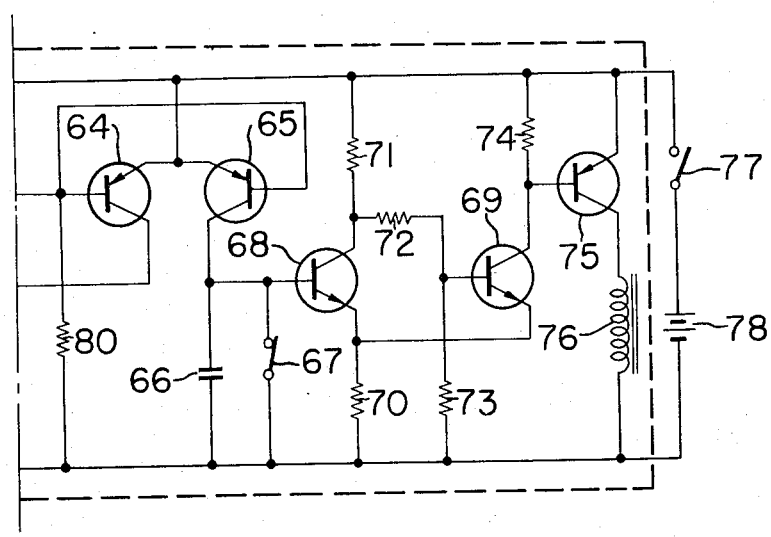

In FIG. 1, light from an object to be photographed passes through a normally open aperture 44 in a photographic lens to a mirror 45, by which the light is directed to pass through a Fresnel lens 46, a condenser lens 47 having a half-mirror M, a lens 48 and an auxiliary aperture 9 to a photoelectric element 8. The photoelectric element 8 cooperates with an exposure time setting variable resistor 25 and resistors 26, 27 to constitute a bridge circuit acting as an exposure operator. The variable resistor 25 is manually adjustable by means of a dial 1 provided with a shutter speed scale.

The output of the bridge circuit is applied as input through an amplifier 2 to a servomotor 7, which is thus energized to drive the auxiliary aperture 9 through gears 6, 5, 4, 3 while driving a slide plate 10 through gears 6, 5 and rack 10', the slide plate 10 being guided by pins 11 and 12. The slide plate 10 is provided with pins 14 and 15, on which a slotted aperture preset lever 13 is received so that the relative position of the slide plate 10 and the preset lever 13 is variable in accordance with the sensitivity of the film in use. A pawl 17 is pivotally mounted on the slide plate 10 by means of a pin 16 and engageable with a sawtooth-like portion 13' formed in the preset lever 13. The slide plate 10 and the preset lever 13 are normally movable together. The preset lever 13 is engaged with a preset ring 18 through an arm 18a to transmit the drive of the servomotor 7 to the preset ring 18.

Referring to FIG. 2, a shutter button stem 20 is provided with a pin 21 which is engaged by the tip end of a retaining pawl 28 normally biased for counter-clockwise rotation by a spring 29. An arm 20a laterally extending from the shutter button stem 20 acts on a switch shifting lever 33, pivotally mounted on a fixed pivot pin 34, to rotate the lever 33 in clockwise direction and shift a movable contact 24 from a fixed contact 22 to another fixed contact 23, thereby disconnecting the photoelectric element 8 from the bridge circuit and connecting it with an electronic shutter circuit 100.

In operation, the dial 1 is turned to set the shutter speed to a desired value, and then the camera is posed to look toward an object to be photographed, whereupon light from the object passes through the photographic lens to the photoelectric element 8. Power switch 77 is then closed so that the output of the bridge circuit energizes the servomotor 7 with the photographic lens aperture 44 kept open, thereby controlling the auxiliary aperture 9. Thus, the quantity of light reaching the photoelectric element 8 is adjusted for increase or decrease, and when the resistance value of the element 8 is balanced with the resistance value of the variable resistor 25, i.e. when the bridge circuit becomes balanced, the servomotor 7 is deenergized. On the other hand, the drive of the servomotor is also transmitted to the slide plate 10 which controls the preset lever 13 having the film sensitivity introduced therein, to thereby set up a proper aperture value.

Subsequently, as the shutter button 20 is depressed to move down the pin 21 therewith, the clamp pawl 28 is permitted to rotate counter-clockwise by the force of the spring 29 until it clamps the then deenergized servomotor 7 or the gear 5 and 6. Further depression of the shutter button 20 causes the arm 20a thereof to rotate the switch shifting lever 33 in clockwise direction. As a result, the movable contact 24 is shifted from the fixed contact 22 to the fixed contact 23, thereby inserting the photoelectric element 8 in the electronic shutter circuit 100. Thus, the electronic shutter circuit determines the exposure time for proper exposure in accordance with the resistance value of the photoelectric element 8.

FIG. 3 illustrates an example of such electronic shutter circuit 100. In this circuit, when connected with the photoelectric element 8, a storage switch 51 assumes ON position, a compression-expansion change-over switch 52 is connected at its contact a (compression phase), and a starter switch 67 assumes ON position. As a result, the current flowing through the photoelectric element 8 is compressed by a logarithmic diode 53 and the voltage so compressed is stored in a storage capacitor 54 because of the switch 51 being opened just prior to the mirror's upward movement.

Further depression of the shutter button 20 shifts the change-over switch 52 to its contact b (expansion phase) to permit the logarithmic diode 53 to serve the purpose of expansion. The voltage stored in the storage capacitor 54 energizes a differential amplifier constituted by field effect transistors 55 and 56, the output of which amplifier is reversed in phase by a transistor 63 and then applied to a next differential amplifer comprising transistors 64 and 65, thereby providing a regenerated current.

As soon as the forward shutter curtain starts to move, the starter switch 67 is opened to permit a capacitor 66 to be charged. When the charging voltage in the capacitor 66 reaches a predetermined value, transistors 68 and 69 forming a Schmidt circuit is turned on and off, respectively. This raises the base potential of a transistor 75, which is thus turned off to cut off the power supply to a rearward curtain holder magnet 76, so that the rearward curtain is closed to provide a preset exposure time and accordingly a proper exposure.

In the above-described operation, if the brightness of the object to be photographed is too high or too low to balance the bridge circuit even for a minimum or a maximum value of the auxiliary aperture 9, the resistance value of the photoelectric element 8 will be either lower or higher than the preset resistance value of the resistor 25. In such case, therefore, when the photoelectric element 8 is changed over for connection with the electronic shutter circuit, the present exposure time is shifted to a new different exposure time available for proper exposure which is determined in accordance with the resistance value as presented by the photoelectric element 8 when it has received the quantity of light passed through the minimum or the maximum value of the auxiliary aperture 9.

Although the electronic shutter circuit is shown to include storage means, the present invention also permits the use of an electronic shutter circuit which includes no storage means.

FIG. 4 shows an embodiment of the present invention in which the servomotor 7 is replaced by a meter 7'. One end of the needle 7'a of the meter 7 actuates the auxiliary aperture 9 to control the quantity of light impinging on the photoelectric element 8. When the bridge circuit has become balanced, the meter 7' is stopped and the other end of the needle 7'a controls the angle of rotation of a sawtoothed ring 37 as in the case of EE cameras, and also controls the preset lever 13 through the gear 5 in the manner described with respect to the previous embodiment.

In FIG. 3, there are seen further parts such as emitter resistors 49 and 50 for amplifier transistors 101 and 102, balancing variable resistor 57, constant current transistor 58, bias diode 61, load resistor 62, common emitter resistor 70, collector resistors 71 and 74, bias resistors 72 and 73, and power source 78.

With the above-described construction, the present invention can achieve the following functions in a TTL type single-lens reflex camera: to preset the shutter speed as desired; to automatically determine the aperture in accordance with the preset shutter speed, to control the exposure time for the electronic shutter in accordance with the determined aperture value and provide a proper exposure during the preset exposure time or an exposure time approximate thereto.

Further, where the system of the present invention is used to determine the exposure after the aperture value has been determined, aperture set ring 91 may be manually turned and set to a desired aperture value, followed by rotation of the preset ring 18 to control the auxiliary aperture 9 through the slide plate 10 and therefore, if the switch 24 is preshifted for connection with the electronic shutter circuit with the aid of suitable shift means, the electronic shutter circuit will automatically determine the shutter speed corresponding to the set aperture.

We claim:

1. An exposure control system capable of operating in the shutter speed preference mode with shutter speed correction for a single lens reflex camera having an aperture presetting means for its phototaking lens, an electronic shutter for through-the-lens photometry control at fully-opened aperture and a movable mirror arranged to provide view-finding through the phototaking lens and to move out of the phototaking light path immediately before a phototaking operation, comprising:

automatic aperture determination means provided with calculator means which include manually operable shutter speed preference setting means and a photoelectric element for receiving light which has passed through the phototaking lens with the aperture thereof fully opened and which has been reflected by said mirror;

a controllable auxiliary aperture in front of said light receiving element;

interlocking means for controlling said auxiliary aperture and said aperture presetting means conformably to each other in response to said automatic aperture determination means while the aperture of said phototaking lens remains fully opened;

an electronic shutter circuit; and means for disconnecting the light receiving element from said calculator after operation of said automatic aperture determination means is completed and then connecting the light receiving element to said electronic shutter circuit, being so constituted when connected with the light receiving element that the shutter speed at which the phototaking is actually performed is determined in accordance with the light incident on the light receiving element through the auxiliary aperture.

2. An exposure control system according to claim 1, wherein said calculator means is provided with means including a servomotor for driving said auxiliary aperture.

3. An exposure control system according to claim 1, wherein said calculator means includes a bridge circuit.

4. An exposure control system according to claim 1, wherein said calculator means includes a galvanometer.

5. An exposure control system according to claim 1, further comprising means for holding said auxiliary aperture to a value determined by said calculator means.

* * * * *